United States Patent
Bhide et al.

(10) Patent No.: US 10,242,063 B2
(45) Date of Patent: **\*Mar. 26, 2019**

(54) BLOOM FILTER UTILIZATION FOR JOIN PROCESSING

(71) Applicant: INTERNATIONAL BUSINESS MACHINES CORPORATION, Armonk, NY (US)

(72) Inventors: Manish A. Bhide, Hyderabad (IN); Shyam R. Mudambi, Wayland, MA (US); Sriram K. Padmanabhan, San Jose, CA (US); Vivek S. Tirumalaraju, Hyderabad (IN)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/214,551

(22) Filed: Jul. 20, 2016

(65) Prior Publication Data

US 2017/0060970 A1 Mar. 2, 2017

Related U.S. Application Data

(63) Continuation of application No. 14/840,797, filed on Aug. 31, 2015.

(51) Int. Cl.
*G06F 17/30* (2006.01)

(52) U.S. Cl.
CPC .. *G06F 17/30498* (2013.01); *G06F 17/30442* (2013.01); *G06F 17/30867* (2013.01); *G06F 17/30463* (2013.01); *G06F 17/30466* (2013.01)

(58) Field of Classification Search
CPC ......... G06F 17/30498; G06F 17/30466; G06F 17/30867; G06F 17/30463;
(Continued)

(56) References Cited

U.S. PATENT DOCUMENTS 7,908,242 B1 \* 3/2011 Achanta ............ G06F 17/30442
707/602
8,359,316 B2 1/2013 Franke et al.
(Continued)

FOREIGN PATENT DOCUMENTS

| EP | 2608070 A1 | 6/2013 |
|---|---|---|
| WO | 2012170049 A1 | 12/2012 |
| WO | 2014049596 A1 | 4/2014 |

OTHER PUBLICATIONS

Barber, Ronald, et al. "Memory-efficient hash joins."Proceedings of the VLDB Endowment;8.4 (2014): 353-364. (Year: 2014).\*

*Primary Examiner* — Mark D Featherstone
*Assistant Examiner* — Diedra McQuitery
(74) *Attorney, Agent, or Firm* — Tihon Poltavets

(57) ABSTRACT

A computer-implemented method includes inserting a bloom filter creation stage after an inner data source identification stage, wherein a join operation is to be performed to join an outer data source with the inner data source. The method inserts a bloom filter search stage after an outer data source identification stage, wherein each row of data from the outer data source is searched against a bloom filter for the inner data source during the bloom filter search stage. The method initializes a read on the inner data source. Subsequent to determining the bloom filter creation stage is complete, the method initializes a read on the outer data source. The method performs the join operation at a join stage.

7 Claims, 5 Drawing Sheets

(58) Field of Classification Search
CPC ......... G06F 17/30563; G06F 17/30442; G06F 17/30448; G06F 17/30424; Y10S 707/99932; Y10S 707/99933; Y10S 707/99934; Y10S 707/99935
See application file for complete search history.

(56) References Cited

U.S. PATENT DOCUMENTS

| | | | |
|---|---|---|---|
| 8,805,850 B2 | 8/2014 | Sukhwani et al. | |
| 8,972,337 B1 | 3/2015 | Gupta | |
| 9,613,066 B2 | 4/2017 | Idicula et al. | |
| 2004/0220904 A1* | 11/2004 | Finlay | G06F 17/30321 |
| 2009/0046581 A1* | 2/2009 | Eswaran | H04L 41/147 |
| | | | 370/230 |
| 2009/0132474 A1 | 5/2009 | Ma et al. | |
| 2011/0131198 A1 | 6/2011 | Johnson et al. | |
| 2012/0317094 A1* | 12/2012 | Bear | G06F 17/30463 |
| | | | 707/714 |
| 2013/0226972 A1 | 8/2013 | Kosuru et al. | |
| 2014/0214796 A1* | 7/2014 | Barber | G06F 17/30466 |
| | | | 707/714 |
| 2014/0337314 A1* | 11/2014 | Potapov | G06F 3/0611 |
| | | | 707/714 |
| 2014/0372407 A1* | 12/2014 | Attaluri | G06F 17/30466 |
| | | | 707/714 |
| 2015/0278306 A1* | 10/2015 | Cheng | G06F 17/30469 |
| | | | 707/714 |

\* cited by examiner

BLOOM FILTER UTILIZATION FOR JOIN PROCESSING

BACKGROUND

The present invention relates generally to join processing and more particularly to utilizing bloom filters in the join process of an Extract Transform Load.

Typically, Extract Transform Load (ETL) refers to a process in database usage, more specifically in data warehousing, performed by an ETL tool. The process includes extracting an original document from a source, transforming the data to fit operational needs, and loading the transformed document into an end target (e.g., database or database warehouse). A join in an ETL process refers to combining a field from two or more tables of data utilizing values common to each of the tables. Join processes in an ETL are typically time consuming since there are a number of I/Os being sent and received from external data locations.

SUMMARY

Embodiments of the present invention disclose a method, computer program product and computer system for bloom filter utilization for join processing. A computer-implemented method includes inserting, by one or more processors, a bloom filter creation stage after an inner data source identification stage, wherein a join operation is to be performed to join an outer data source with the inner data source; inserting, by one or more processors, a bloom filter search stage after an outer data source identification stage, wherein each row of data from the outer data source is searched against a bloom filter for the inner data source during the bloom filter search stage; initializing, by one or more processors, a read on the inner data source; subsequent to determining the bloom filter creation stage is complete, initializing, by one or more processors, a read on the outer data source; and performing, by one or more processors, the join operation at a join stage.

DETAILED DESCRIPTION

Embodiments of present invention utilize bloom filters to accelerate the processing of joins in an ETL process. The present invention manages instances where (i) the reference data (utilized in join) is staged and (ii) where the reference data is not staged. The present invention allows for a cost based decision to manage a join workflow utilizing bloom filters. The join workflow utilizing bloom filters allows for a reduction in I/O resources resulting in an increase in throughput and a decrease in system load.

Figure 1:
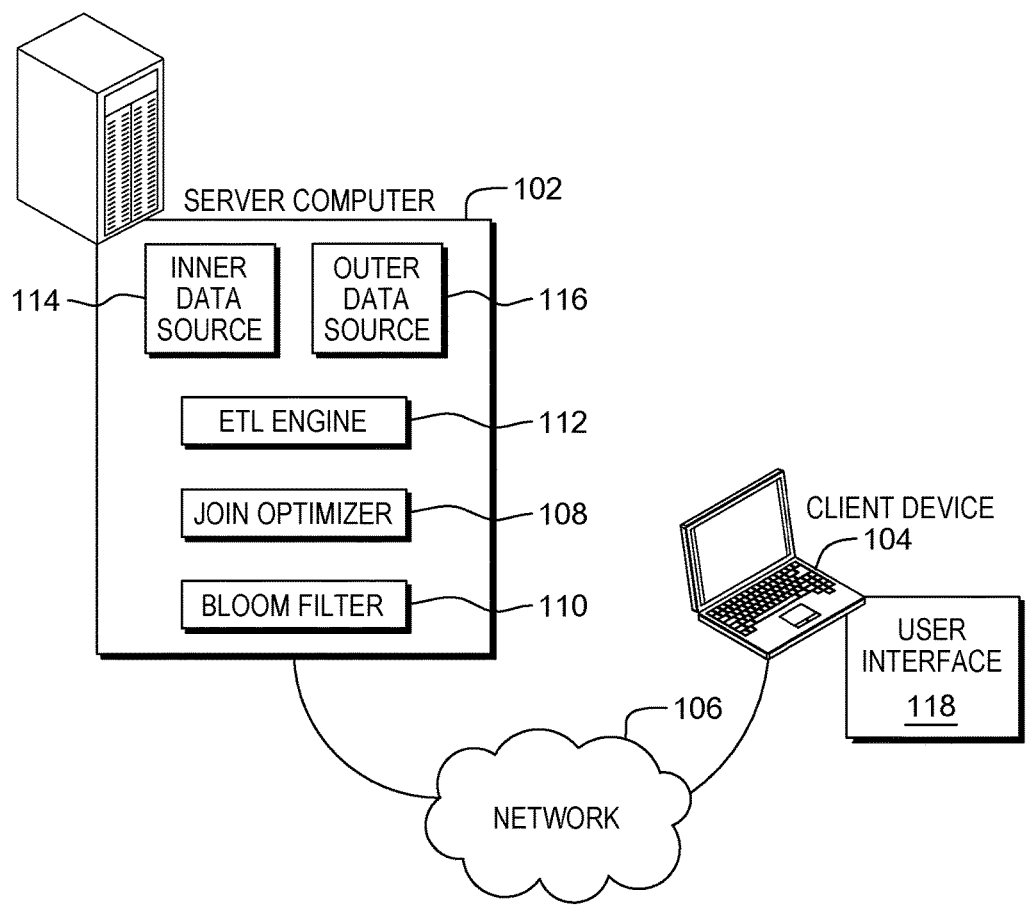
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102 and client device 104 interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 has the ability to communicate with other computer devices to query the computer devices for information.

Join optimizer 108 residing in server computer 102 utilizes bloom filter 110 when managing joins in an Extract Transform and Load (ETL) process. Bloom filter 110 represents a probabilistic data structure, to test whether an element is a member of a set. For example, join optimizer 108 can utilize bloom filter 110 to determine if an element in outer data source 116 is a member in another set, inner data source 114. Bloom filter 110 produces one of two results for whether an element is a member of a set (i) an element is not a member of a set or (ii) an element is possibly a member of a set. Join optimizer 108 has the ability to generate and utilize bloom filter 110 utilizing statistical methods known in the art. In this embodiment, a data source for which join optimizer 108 considers creating bloom filter 110 is referred to as inner data source 114 and a data source for which join optimizer 108 searches against the bloom filter is referred to as outer data source 116.

In one embodiment, join optimizer 108 can insert a bloom filter creation stage after inner data source 114 and a bloom filter search stage after outer data source 116. Subsequent to the insertion of the bloom filter 110 after inner data source 114, join optimizer 108 can initialize reads against the created bloom filter 110 to mitigate multiple fetches for data. In another embodiment, join optimizer 108 can generate bloom filter 110 based on reference data (i.e., inner data source 114) and insert the bloom filter 110 after the source stage. Join optimizer 108 can update the path of the inserted bloom filter in the inner dataset header and determine if optimization conditions are satisfied for utilization of the bloom filter in the join. Subsequent to determining the optimization conditions are satisfied, join optimizer 108 can insert the bloom filter after the outer source and perform the join of inner data source 114 and outer data source 116.

Extract Transform and Load (ETL) engine 112 residing in server computer 102 has the ability to receive source documents from multiple computer devices not illustrated in FIG. 1. ETL engine 112 can transform the source documents and load the transformed documents (i.e., target documents) into a target storage location. Such a transformation, also referred to as an ETL process, transforms the content of a source document (e.g., HTML to plain text) and stores the transformed content in the form of a target document. ETL engine 112 can be a server-based program. In this embodiment, ETL engine 112 is transforming data by joining inner data source 114 and outer data source 116. ETL engine 112 may communicate with or comprise of programs or tools such as, join optimizer 108.

Client device 104 may be a desktop computer, a laptop computer, a tablet computer, a specialized computer server, a smart phone, or any programmable electronic device capable of communicating with server computer 102 via network 106. In general, client device 104 represents any programmable electronic device or combination of programmable electronic devices capable of executing machine readable program instructions and communicating with other computing devices via a network, such as network 106. Client device 104 includes user interface 118 through which a user of client device 104 can communicate with ETL engine 112 residing on server computer 102.

User interface 118 provides an interface between client device 104, ETL engine 112, and join optimizer 108. User interface 118 may be a graphical user interface (GUI) or a web user interface (WUI) or a command line interface and can display text, documents, web browser windows, user options, application interfaces, and instructions for operation, and includes the information (such as graphic, text, and sound) a program presents to a user and the control sequences the user employs to control the program. User interface 118 may also be mobile application software that provides an interface between a user of client device 104 and importation optimizer. Mobile application software, or an "app", is a computer program designed to run on smart phones, tablet computers and other mobile devices. User interface 118 enables a user of client device 104 to establish administrative parameters for operations that ETL engine 112 and join optimizer 108 performs.

In general, network 106 can be any combination of connections and protocols that will support communications among server computer 102 and client device 104. Network 106 can include, for example, a local area network (LAN), a wide area network (WAN), such as the internet, a cellular network, or any combination of the preceding, and can further include wired, wireless, and/or fiber optic connections. In one embodiment, join optimizer 108 can be a web service accessible via network 106 to a user of client device 104. In another embodiment, join optimizer 108 may be operated directly by a user of server computer 102.

Figure 2:
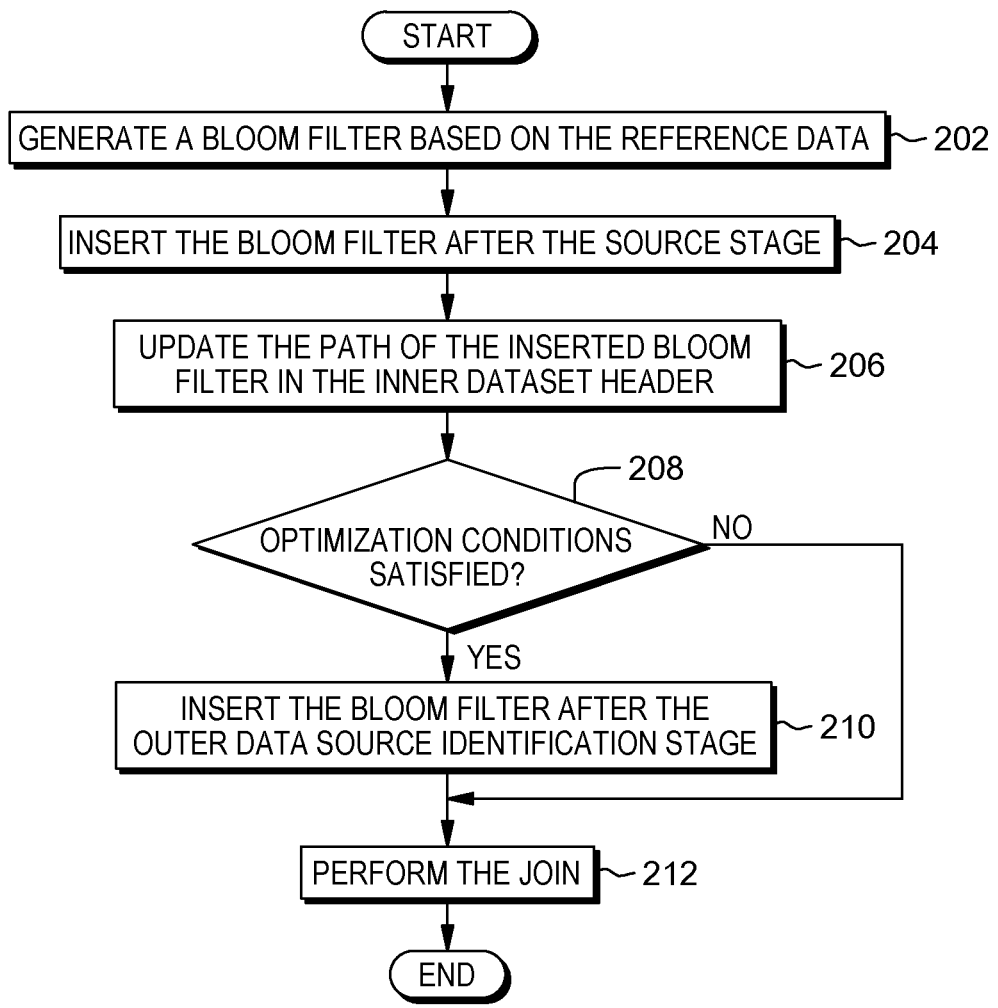
FIG. 2 is a flowchart depicting one embodiment of bloom filter utilization for staged reference data, in accordance with the present invention.

FIG. 2 is a flowchart depicting one embodiment of bloom filter utilization for staged reference data, in accordance with the present invention. As depicted the method includes generating (202) a bloom filter based on the reference data, inserting (204) the bloom filter after the source stage, updating (206) the path of the inserted bloom filter in the inner dataset header, determining (208) if the optimization conditions are satisfied, inserting (210) the bloom filter after the outer data source identification stage, and performing (212) the join. In one embodiment, the bloom filter utilization is conducted by join optimizer 108.

The method may commence by generating (202) a bloom filter based on the reference data. In this embodiment, join optimizer 108 determines to generate the bloom filter based on the reference data during the dataset creation, where the inner data source represents the dataset being created. The dataset creation represents a stage with a single output link, where a set of mock data fitting specified metadata is produced. The specified metadata represents metadata a user specifies on the output link which determines the columns of data being generated for the inner data source.

The method may continue by inserting (204) the bloom filter after the source stage. In this embodiment, join optimizer 108 inserts the bloom filter after the source stage in the dataset creation job. The method may continue by updating (206) the path of the inserted bloom filter in the inner dataset header. In this embodiment, join optimizer 108 updates the inner dataset header for the inner data source with the path of the inserted bloom filter. By updating the inner data header for the inner data source, the bloom filter is associated with the inner data source and join optimizer 108 can search the rows of the outer data source against the bloom filter.

The method may continue by determining (208) if the optimization conditions are satisfied. In the event the optimization conditions are satisfied ("yes" branch, 208), optimization program may continue by inserting (210) the bloom filter after the outer data source identification stage. In the event the optimization conditions are not satisfied ("no" branch, 208), join optimizer may continue by performing (212) the join, without utilizing the inserted bloom filter. Join optimizer 108 considers an optimization with bloom filters for a join operation on two different levels. The join operation has to satisfy the following conditions, (i) the join operation should not have any additive stages between the inner data source and the join, (ii) join keys should pass through unmodified from the inner data source to the join, and (iii) join keys should pass through unmodified from the outer data source to the join. Join keys representing a mapping of the column and rows of the inner data source and outer data source.

Additionally, join optimizer 108 can include a rule for whether or not workload characteristics for a specific join operation are met. The workload characteristics includes a determination of whether a processing cost of a specific join operation without a bloom filter is greater than a processing cost of the specific join operation with the bloom filter. Below, Table 1 outlines an example for calculating processing costs for the specific join operation with and without the bloom filter. The variables x, y, and z are computed for the hardware profiles, $n_1$ and $n_2$ are based on specific join operation, and r is based on the data and filter configuration.

TABLE 1

Example Processing Cost Calculations

Without Bloom Filter Cost = $x*n_1 + y*n_2$
With Bloom Filter Cost = $x*n_1 + x*n_2/r + y*n_1 + z*n_2$
Where:   $n_1$ = volume of dataset (i.e., inner data source)
         $n_2$ = volume of database dataset (i.e., outer data source)
         x = sort cost per row
         y = bloom filter creation cost per row
         z = bloom filter processing cost per row
         r = selectivity of bloom filter
With Bloom Filter Cost < Without Bloom Filter Cost
$x*n_{1+} x*n_2/r + y*n_1 + z*n_2 < x*n_1 + y*n_2$ (i.e., $y*n_{1+} z*n_2 < x*n_2*(r-1)/r$)

The method may continue by inserting (210) the bloom filter after the outer data source identification stage. The bloom filter after the outer data source identification stage represents the search stage where data in the outer data source is searched against the bloom filter of the inner data source. The method may continue by performing (212) the join. Subsequent to the insertion of the bloom filter, join optimizer can perform the join of the inner data source and outer data source utilizing the inserted bloom filter.

Figure 3A:
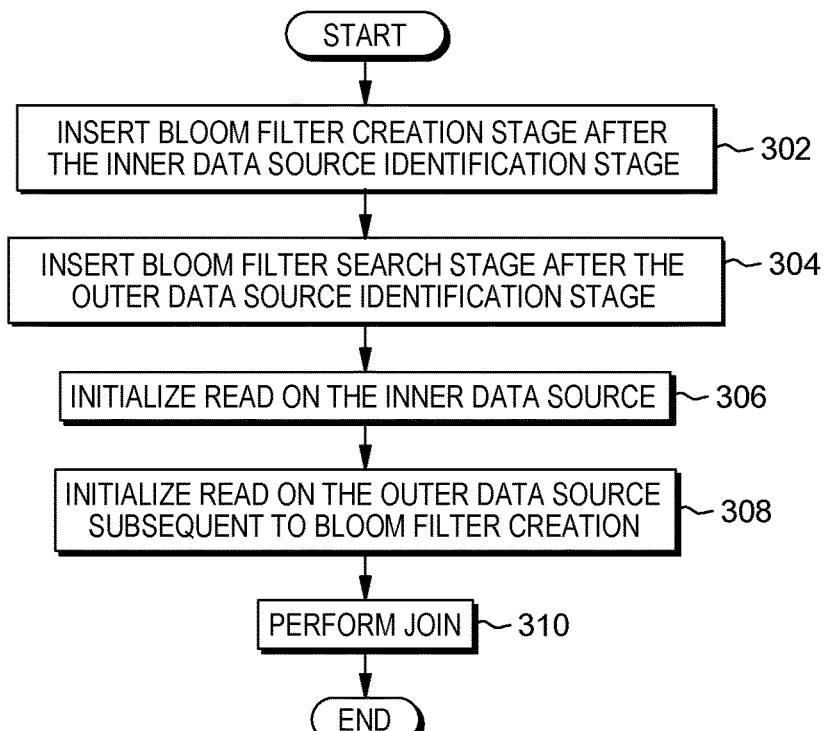
FIG. 3A is a flowchart depicting one embodiment of bloom filter utilization for non-staged reference data, in accordance with the present invention.

FIG. 3A is a flowchart depicting one embodiment of bloom filter utilization for non-staged reference data, in accordance with the present invention. As depicted the method includes, inserting (302) bloom filter creation stage after the inner data source identification stage, inserting (304) bloom filter search stage after the outer data source identification stage, initializing (306) read on the inner data source, initializing (308) read on the outer data source subsequent to bloom filter creation, and performing (310) the join. In one embodiment, the bloom filter utilization is conducted by join optimizer 108.

The method may commence by inserting (302) bloom filter creation stage after the inner data source identification stage. Since the inner data source is not staged, join optimizer 108 inserts the bloom filter creation stage downstream after the inner data source identification stage but prior to the join operation in the ETL process. The method may continue by inserting (304) bloom filter search stage after the outer data source identification stage, where data in the outer data source is searched against the bloom filter of the inner data source.

The method may continue by initializing (306) read on the inner data source. The method may continue by initializing (308) read on the outer data source subsequent to bloom filter creation. The completed creation of the bloom filter ensures all the rows of the outer data source are searched against all the rows of the inner data source through the completed bloom filter. The method may continue by performing (310) the join. Subsequent to the insertion of the bloom filter, join optimizer can perform the join of the inner data source and outer data source utilizing the inserted bloom filter.

Figure 3B:
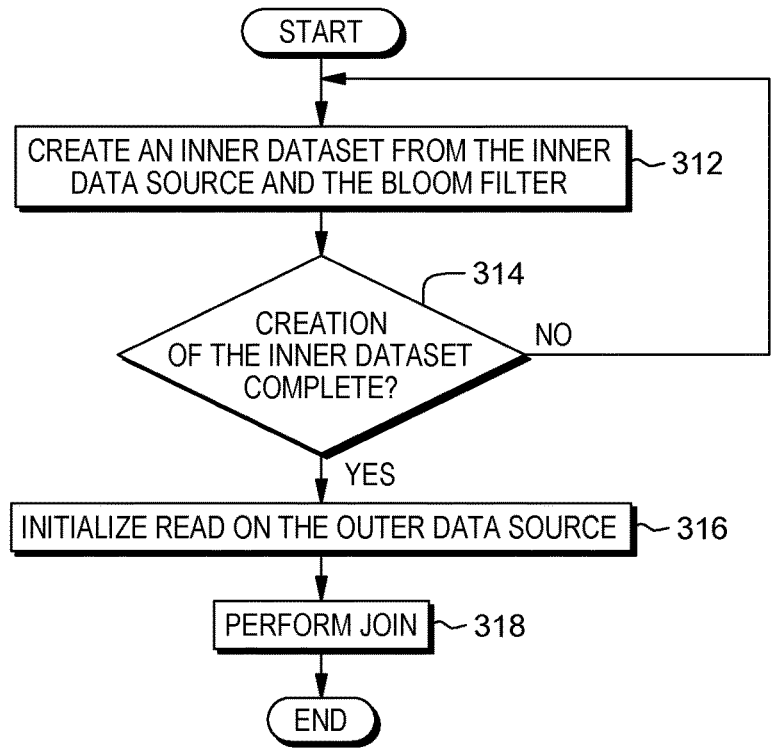
FIG. 3B is a flowchart depicting one embodiment of bloom filter utilization for non-staged reference data, in accordance with the present invention.

FIG. 3B is a flowchart depicting one embodiment of bloom filter utilization for non-staged reference data, in accordance with the present invention. As depicted the method includes, creating (312) an inner dataset from the inner data source and the associated bloom filter, determining (314) if the creation of the inner dataset is complete, initializing (316) read on the outer data source, and performing (318) the join. In one embodiment, the bloom filter utilization is conducted by join optimizer 108.

The method may commence by creating (312) an inner dataset from the inner data source and the associated bloom filter. In this embodiment, join optimizer 108 creates an inner dataset utilizing data from the inner data source and the associated bloom filter rather than utilizing data being staged. Since the inner data source is non-staged data, join optimizer 108 can utilize the inner data source, apply the associated bloom filter, and create the inner dataset.

The method may continue by determining (314) if the creation of the inner dataset is complete. In the event the creation of the inner dataset is complete ("yes" branch, 314), the method may continue by initializing (314) read subsequent to bloom filter creation. In the event the creation of the inner dataset is not complete, the method may continue by idling until the creation of the inner dataset is complete. The creation of the inner data set triggers the creation of the bloom filter search stage after the outer data source identification stage.

The method may continue by initializing (316) read on the outer data source. In this embodiment, join optimizer 108 performs the initialization of the read subsequent to the creation of the bloom filter by searching rows in the outer data source against the bloom filter of the inner dataset. The method may continue by performing (318) the join. Subsequent to the insertion of the bloom filter, join optimizer can perform the join of the inner data source and outer data source utilizing the inserted bloom filter.

Figure 3C:
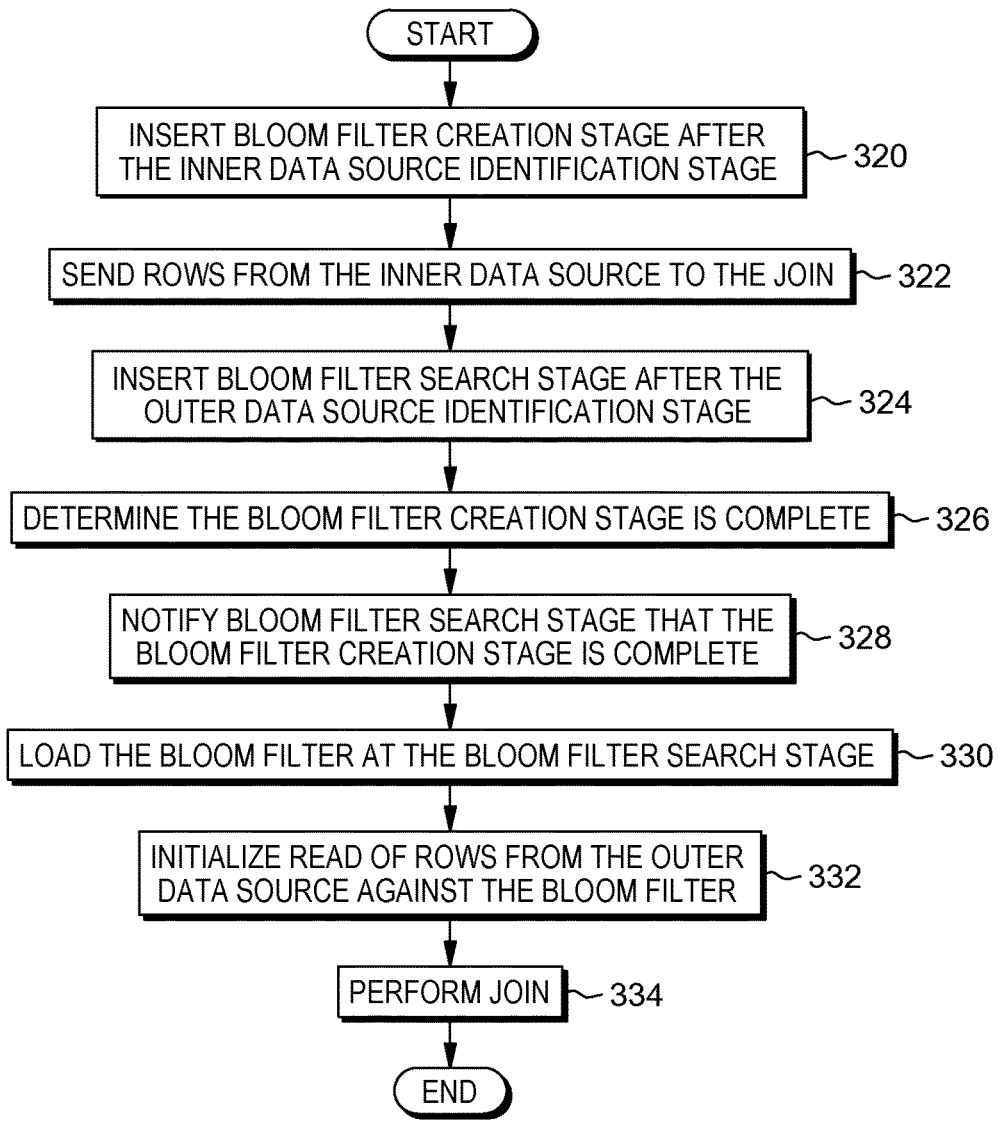
FIG. 3C is a flowchart depicting one embodiment of bloom filter utilization for non-staged reference data, in accordance with the present invention.

FIG. 3C is a flowchart depicting one embodiment of bloom filter utilization for non-staged reference data, in accordance with the present invention. As depicted the method includes, inserting (320) bloom filter creation stage after the inner data source identification stage, sending (322) rows from the inner data source to the join, inserting (324) bloom filter search stage after the outer data source identification stage, determining (326) the bloom filter creation stage is complete, notifying (328) bloom filter search stage the bloom filter creation stage is complete, loading (330) the bloom filter at the bloom filter search stage, initializing (332) read of rows from the outer data source against the bloom filter, and performing (334) the join. In one embodiment, the bloom filter utilization is conducted by join optimizer 108.

The method may commence by inserting (320) bloom filter creation stage after the inner data source identification stage. Since the inner data source is not staged, join optimizer 108 inserts the bloom filter creation stage downstream after the inner data source identification stage but prior to the join operation in the ETL process. The method may continue by sending (322) rows from the inner data source to the join. In this embodiment, join optimizer 108 sends rows from the inner data source to the join stage of the ETL process prior to the bloom filter creation stage being completed.

The method may continue by inserting (324) bloom filter search stage after the outer data source identification stage. The bloom filter search stage operates in a non-blocking pass mode, where rows of data are not searched against the bloom filter of the inner data source because it has not been completed yet. As a result, until the bloom filter creation stage is completed, the rows from the outer data source pass through to the join stage of the ETL process.

The method may continue by determining (326) the bloom filter creation stage is complete. In this embodiment, an ETL engine can join the rows from the outer data source and the rows from the inner data source until join optimizer 108 determines the bloom filter creation stage is complete and rows being read from the outer data source can now be searched against the bloom filter.

The method may continue by notifying (328) bloom filter search stage the bloom filter creation stage is complete. With the notification, join optimizer 108 removes the non-blocking pass mode, where rows of data are not searched against the bloom filter of the inner data source because it has not been completed yet. Instead, join optimizer 108 searches each row of the outer data source against the bloom filter of the inner data source. The method may continue by loading (330) the bloom filter at the bloom filter search stage and initializing (332) read of rows from the outer data source against the bloom filter. As a result, rows from the inner data source no longer pass through to the join and rows from the outer data source are searched against the completed bloom filter at the creation stage.

The method may continue by performing (334) the join. Subsequent to the insertion of the bloom filter, join optimizer can perform the join of the inner data source and outer data source utilizing the inserted bloom filter.

Figure 4:
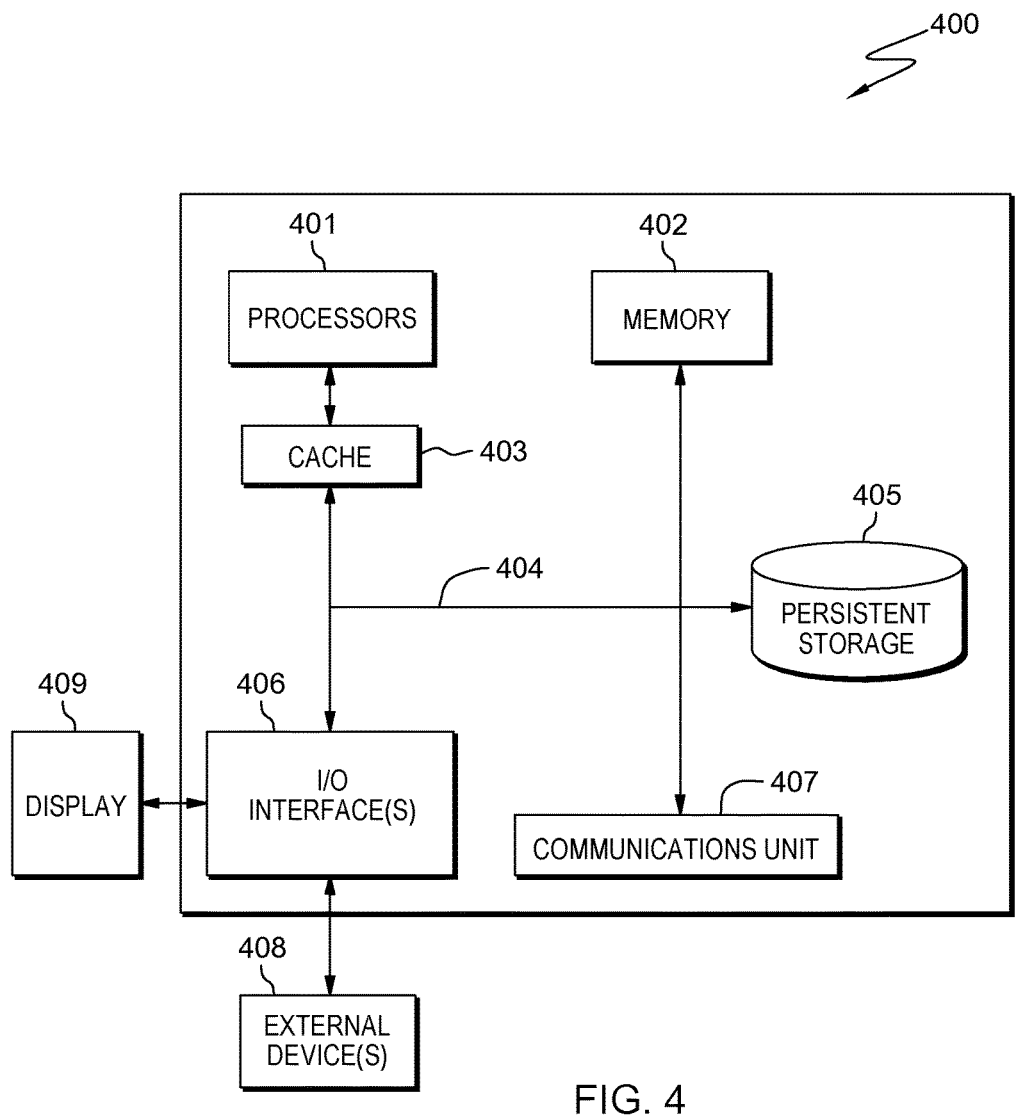
FIG. 4 is a block diagram of components of a computer system, such as the computer server of FIG. 1, in an embodiment in accordance with the present invention.

FIG. 4 depicts computer system 400, where server computer 102 is an example of a system that includes join optimizer 108. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/ output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   inserting, by one or more processors, a bloom filter creation stage after an inner data source identification stage, wherein a join operation is to be performed to join an outer data source with the inner data source;
   responsive to determining a plurality of optimization conditions are satisfied, wherein the plurality optimization conditions at least specify that the join operation does not have any additive stages between the inner data source and a join stage, determining, by one or more processors, to insert a first bloom filter search stage after an outer data source identification stage;
   inserting, by one or more processors, the first bloom filter search stage after the outer data source identification stage, wherein each row of data from the outer data source is searched against a first bloom filter for the inner data source during the first bloom filter search stage;
   initializing, by one or more processors, a read on the inner data source, wherein a plurality of rows from the inner data source pass through to the join stage;
   responsive to determining the bloom filter creation stage is complete, initializing, by one or more processors, a read on the outer data source against the first bloom filter, wherein the plurality of rows from the inner data source pass through to the bloom filter creation stage; and
   performing, by one or more processors, the join operation of the inner data source and the outer data source at the join stage.

2. The method of claim 1, further comprising:
   creating, by one or more processors, an inner data set based at least on the inner data source and the first bloom filter.

3. The method of claim 1, further comprising:
   generating, by one or more processors, a second bloom filter based on reference data during a dataset creation job;
   inserting, by one or more processors, the second bloom filter after a data source during the dataset creation job; and
   updating, by one or more processors, a path to the second bloom filter in an inner dataset header for the inner data source.

4. The method of claim 3, further comprising:
   subsequent to determining the plurality optimization conditions are satisfied, determining, by one or more processors, to insert a second bloom filter search stage after the outer data source identification stage.

5. The method of claim 3, further comprising:
   subsequent to determining the plurality optimization conditions are not satisfied, determining, by one or more processors, to perform the join operation between the inner data source and the outer data source at the join stage without the second bloom filter.

6. The method of claim 1, wherein the plurality optimization conditions are further selected from a group consisting of: join keys pass through unmodified from the inner data source to the join, join keys pass through unmodified from the outer data source to the join, and a cost of a specific join operation without a bloom filter is greater than a processing cost of the specific join operation with the bloom filter.

7. The method of claim 1, further comprising:
   sending, by one or more processors, the plurality of rows from the inner data source to the join stage, wherein the one or more rows are not searched against the first bloom filter;
   responsive to determining, the bloom filter creation stage is complete, notifying, by one or more processors, the first bloom filter search stage that the bloom filter creation stage is complete; and loading, by one or more processors, the first bloom filter at the first bloom filter search stage.

\* \* \* \* \*